Figure 1:
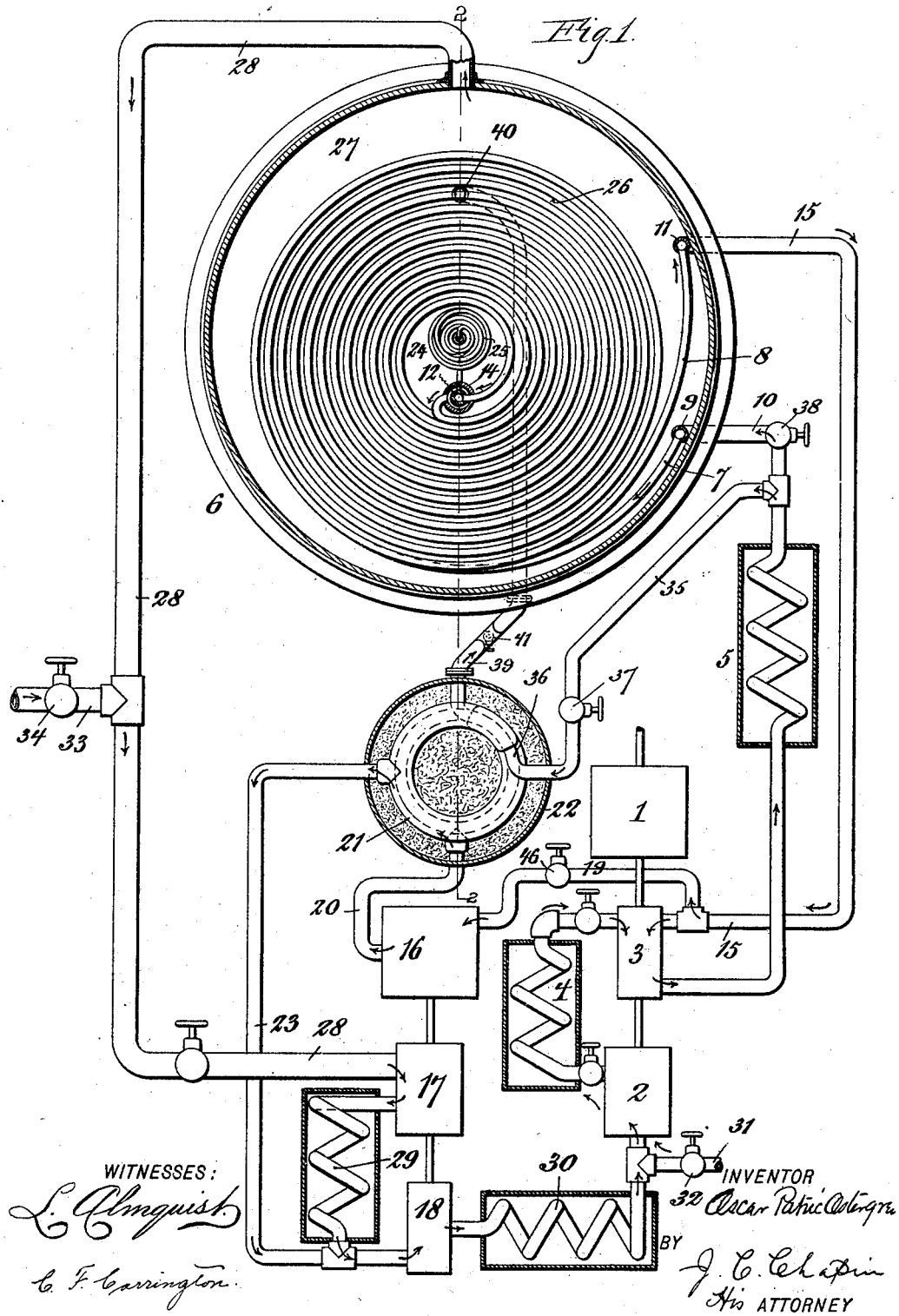

No. 647,514. Patented Apr. 17, 1900.
O. P. OSTERGREN.
LIQUEFACTION OF AIR.
(Application filed Aug. 26, 1899.)
(No Model.) 4 Sheets—Sheet 1.

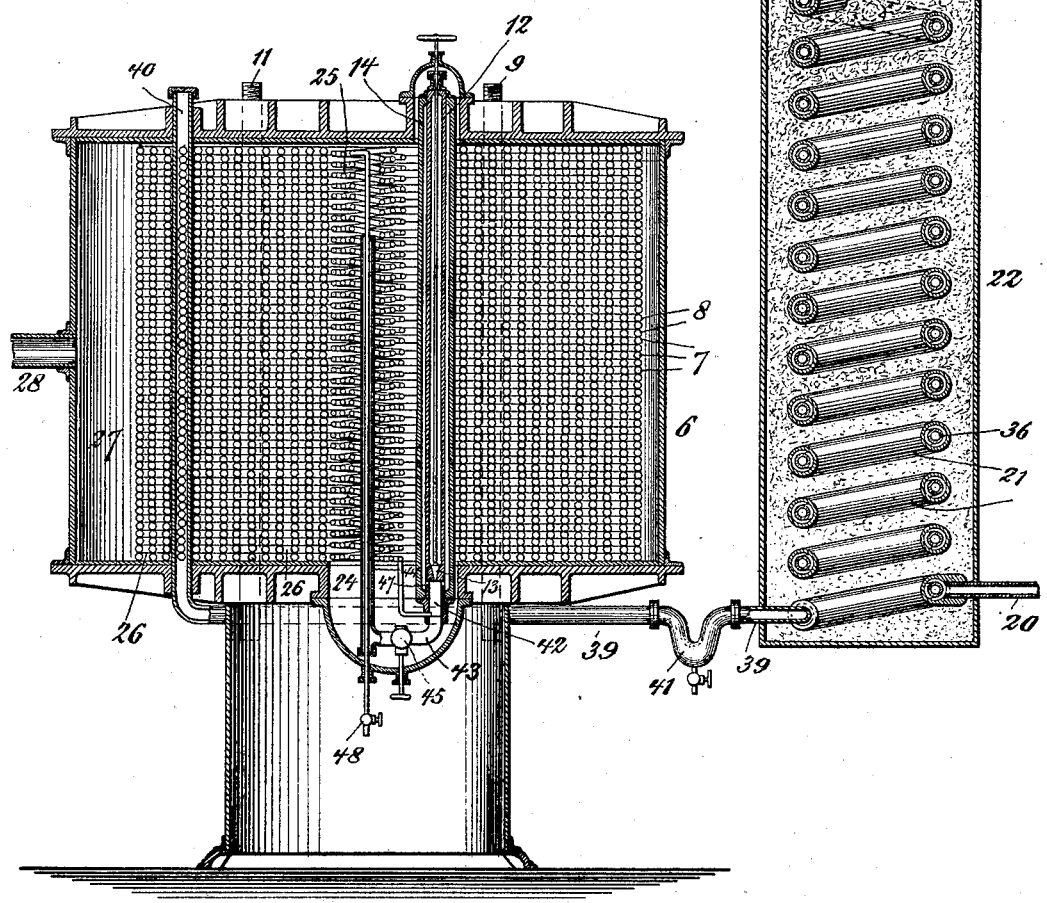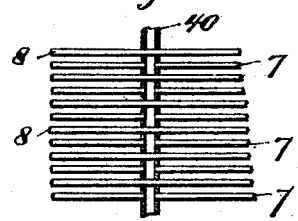

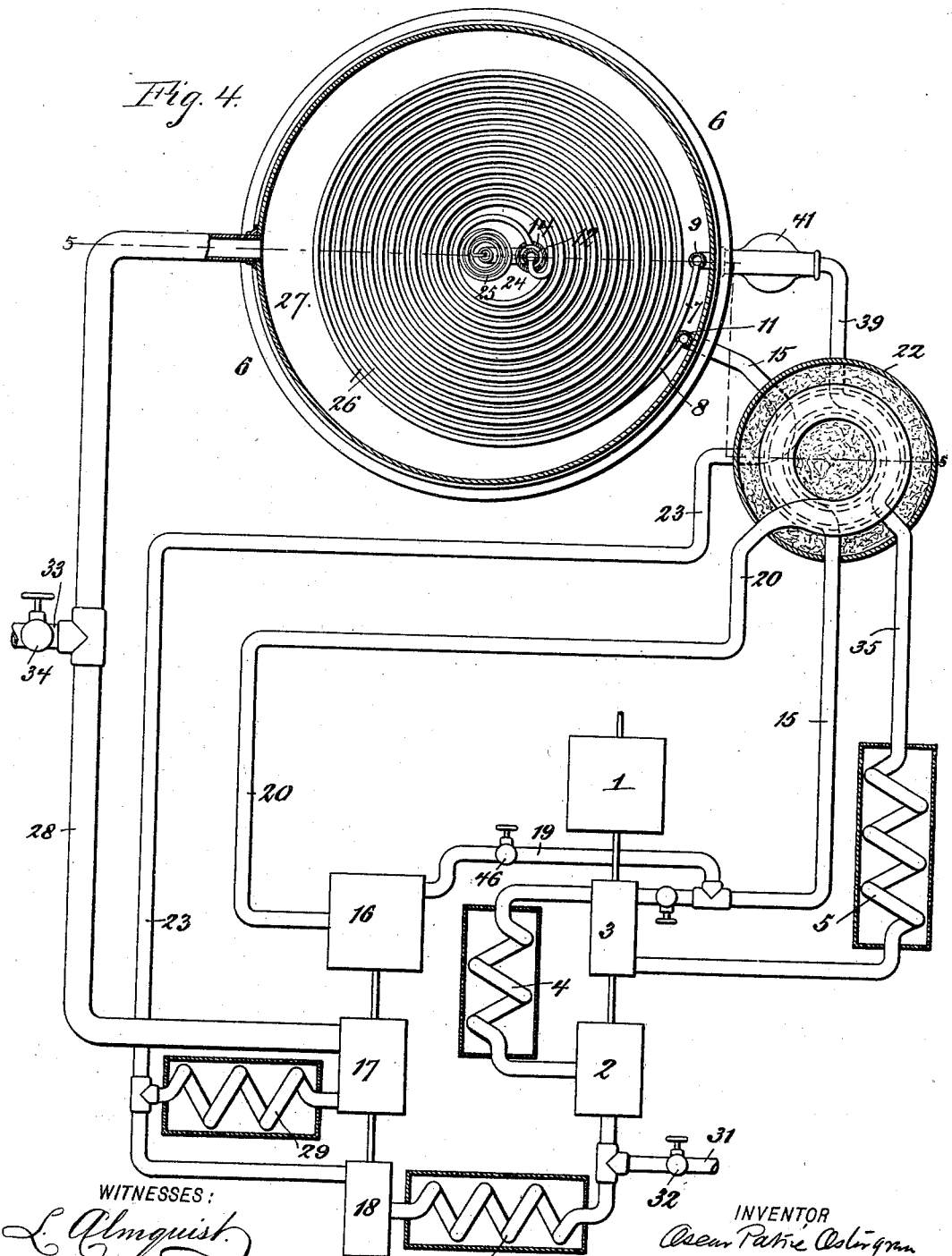

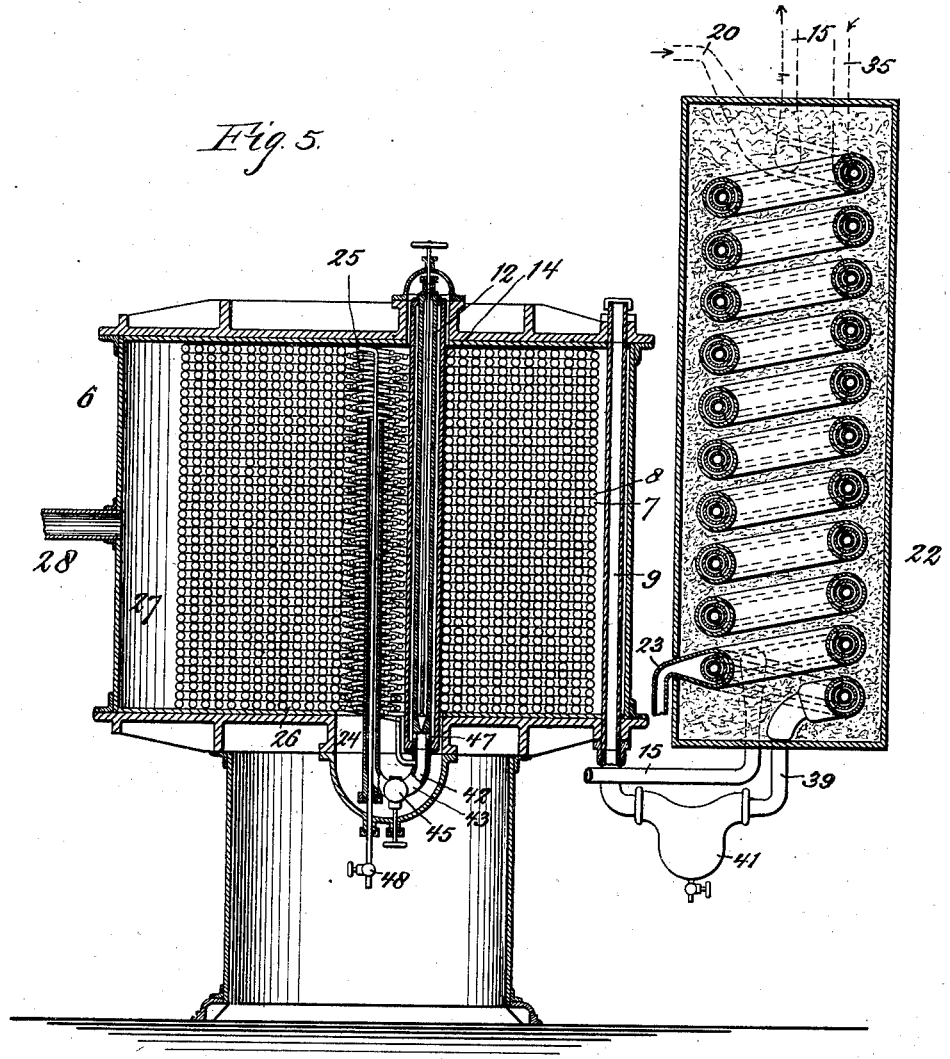

UNITED STATES PATENT OFFICE.

OSCAR PATRIC OSTERGREN, OF NEW YORK, N. Y., ASSIGNOR OF ONE-HALF TO SAMUEL M. GARDENHIRE, OF SAME PLACE.

LIQUEFACTION OF AIR.

SPECIFICATION forming part of Letters Patent No. 647,514, dated April 17, 1900.

Application filed August 26, 1899. Serial No. 728,544. (No model.)

*To all whom it may concern:*

Be it known that I, OSCAR PATRIC OSTERGREN, a citizen of the United States of America, and a resident of New York, (Brooklyn,) county of Kings, State of New York, have invented certain new and useful Improvements in Liquefaction of Air, of which the following is a specification.

My invention relates to apparatus for refrigerating and liquefying air or other gases, particularly for the liquefaction of air.

My apparatus comprises a system and combination of compressors, coolers, counter-current condenser, and precooler, to be hereinafter particularly set forth; and my invention further consists in the particular arrangement of the various apparatus and in their connections with each other, whereby the greatest results as to efficacy and economy are attained.

My invention further consists in certain details of construction of certain of the apparatus, as set forth more fully in the following specification.

I will now proceed to describe an apparatus embodying my invention, and will then point out the novel features in claims.

In the drawings, Figure 1 represents a diagrammatic view, in horizontal section, of an apparatus embodying my invention. Fig. 2 represents a central vertical section of my improved form of counter-current condenser and improved precooler, the plane of section being on line 2 2 of Fig. 1. Fig. 3 is a detail. Fig. 4 is a diagrammatic view taken similarly to Fig. 1, illustrating a slightly-modified form of my apparatus. Fig. 5 is a view similar to Fig. 2 of the counter-current condenser and precooler shown in Fig. 4, the plane of section being on line 5 5 of Fig. 4.

Similar reference characters designate corresponding parts in all the figures.

Reference characters 1, 2, and 3 designate a compressor, of which 1 is the power-cylinder, 2 is the low-pressure cylinder for the first stage of the compression, and 3 is the high-pressure cylinder arranged for the second stage of the compression.

4 designates a cooler of any desired form, conventionally shown here as a coil, which is arranged between the high and low pressure compression-cylinders 3 and 2. 5 designates another cooler arranged between the high-pressure cylinder 3 and the counter-current condenser, (designated as a whole by reference character 6.) The condenser 6 contains two series of spiral tubes 7 and 8, superimposed upon each other in close contact, and the coils of both series are arranged alternately one of the other. The two series are arranged to carry currents going in opposite directions, the coils designated by the reference 7 carrying the ingoing currents and connecting with a common stand-pipe 9, to which the pipe 10, leading from the discharge side of the cooler 5, is also connected, and 8 carrying the outgoing currents and connected with a common stand-pipe 11. At their inner ends the said spiral coils comprising the series 7 are connected to a central pipe 12. The said pipe is provided with a valve 13 at its lower end, which when open affords communication between the central pipe 12 and a pipe 14, surrounding it through ports 47. (See Fig. 2.) The inner ends of the spiral coils comprising the series 8 are connected with the said outer pipe 14. The stand-pipe 11, to which the outer ends of the said series 8 are connected, is in communication through the pipe 15 with the intake side of the high-pressure compression-cylinder 3.

16, 17, and 18 designate another compound compressor, of which 16 is the power-cylinder, 17 the low-pressure compression-cylinder, at which the first stage of the compression in this compressor takes place, and 18 is the high-pressure cylinder or the one in which the second stage of the compression takes place. The power-cylinder 16 is arranged to be driven by compressed air, which it receives from a branch pipe 19 from the return-pipe 15.

20 designates the exhaust from the power-cylinder 16, which communicates with one end of the outer coil 21 of a precooler, (designated as a whole by reference character 22.) The opposite or upper end of said coil connects with the intake side of the high-pressure compression-cylinder 18 through pipe 23, as shown.

The counter-current condenser 6 is, with a central chamber 24, arranged within the last turn of the spiral coils 7 and 8. The central pipes 12 and 14 are arranged within this chamber, as also are undercooling-coils 25, to be presently explained. The central chamber 24 connects with a spiral channel 26, arranged between the coils of the spiral tubes 7 8. The said tubes are located so close together as to form a continuous wall, such walls inclosing the channel 26. The said channel 26 discharges into an open space or chamber 27 outside of the said coils and within the outer casing of the said counter-current condenser 6. Air that is discharged into said chamber 27 is connected along pipe 28 into the intake side of the low-pressure compression-cylinder 17. The discharge from the said cylinder leads through a cooling-coil 29 to the intake side of the high-pressure compression-cylinder, joining with the currents of air from the precooler 22 through the pipe 23. The discharge from the high-pressure compression-cylinder 18 is to a cooling-coil 30 and from thence to the intake side of compresion-cylinder 2 of the compressor 1 2 3. A branch pipe 31 is arranged in connection with the intake side of the said cylinder 2, through which atmospheric air may be taken when first starting up the apparatus. The flow through this pipe may be regulated or entirely stopped by the use of a valve 32 there provided.

33 designates a branch pipe for receiving atmospheric air after the apparatus has been running long enough. The passage of air through the said pipe is controlled by a valve 34.

35 designates a branch pipe leading from the pipe 10 to the upper end of the inner coil 36 of the precooler 22. A valve 37 in the pipe 35 and another valve 38 in the pipe 10 control the distribution of fluid therethrough. A pipe 39 connects with the lower end of the inner coil 36 of the precooler and leads to a stand-pipe 40, arranged in the ingoing spiral coils 7 in the counter-current condenser 6. The said stand-pipe discharges into the said coils, as shown diagrammatically in Fig. 3, while the tubes of the series 8 merely pass through the said stand-pipe without communicating with the interior thereof. In Fig. 3 a portion of the said stand-pipe 40 is shown and portions of the said coils; but instead of the said coils being shown in contact with each other, as they really are in practice, they are shown as separated, in order to illustrate more clearly their connection with the said stand-pipe.

A trap 41 is located in the pipe 39 for a purpose to be hereinafter set forth.

With reference now more particularly to Fig. 2, reference character 42 designates the expansion-chamber, located beneath the central pipe 12 in the counter-current condenser 6. A pipe 43 connects with said expansion-chamber and leads to the lower end of a vertical pipe 44. A valve 45 is arranged in the said pipe 43, which discharges into the central chamber 24. One end of the beforementioned undercooling-coil 25 connects with the said expansion-chamber 42, and the other end of said undercooling-coil passes down through the said vertical pipe 44 and discharges through a valve 48, outside of the chamber 24, in which the said undercooling-coil is arranged.

The operation of the apparatus is as follows: To start up, valve 46 in branch pipe 19 and valve 37 in branch pipe 35 are closed. Valve 32 and valve 38 are open. The compressor 1 2 3 is started up. Atmospheric air will be drawn through pipe 31, compressed in cylinder 2, cooled in cooler 4, compressed to second stage in compression-cylinder 3, cooled again in cooler 5, and conducted into the counter-current condenser 6 through the stand-pipe 9 and the intake spiral coils 7. From thence the air will pass into the central pipe 12 through the valve 13, which will be open, and through the ports 47 into the pipe 14. From thence it will return through the outgoing spiral coils 8 to the stand-pipe 11 and back through the pipe 15 into the compression-cylinder 3, where it is again compressed and returned to the counter-current condenser. Valve 45 will now be opened and a certain quantity of the air will pass therethrough and be discharged into chamber 24 and from thence through spiral channel 26 into chamber 27. From chamber 27 the said air will be conducted back through pipe 28 to compression-cylinder 17, where it will be recompressed, cooled in coil 29, and conducted to compression-cylinder 18 for still further compression. By reason of a well-known law the temperature of the currents of air in the counter-current condenser will gradually decrease, until finally they will become so cold that upon expanding through valve 13 into expansion-chamber 42 portions thereof will liquefy and will pass from the said expansion-chamber into the undercooling-coil 25. After the apparatus has been well started up the valve 46 will be opened and a portion of the return-currents through the pipe 15 will pass through pipe 19 into the power-cylinder 16 and will drive the compressor 16 17 18. After having been used in the power-cylinder 16 the said air will be discharged through the pipe 20 into the outer coil 21 of the precooler 22, from thence it will pass through the pipe 23 into the compression-cylinder 18, and will then be recompressed. In passing to the compression-cylinder 18 it is joined by return-currents from the chamber 27 in the counter-current condenser through the pipe 28, the compression-cylinder 17, and cooling-coil 29, as before explained. The combined currents being recompressed pass through the cooling-coil 30 and into the compression-cylinder 2 for still further compression. When the apparatus is at this stage, or as soon as compressor 16, 17, and 18 is started up, the valve 32 is closed, and fresh atmospheric air that is required to take the place of that liquefied is introduced through branch pipe 33 and valve 34. At this time also the valves 37 and 38 are so manipulated as to cause certain portions of the currents of air from the cooler 5 to pass downwardly through the inner coil 36 of the precooler 22. In passing through the precooler, which is itself a counter-current apparatus, the temperature of the said currents from the pipe 35 through the coil 36 will be very much lowered. Hence the said currents will be introduced into the counter-current-condenser coil 7 at a point about equal thereto in temperature as at the stand-pipe 40. It is estimated that the currents of air in leaving the precooler along pipe 39 will be at a temperature of at least 14° to 17° below zero. At this temperature all moisture will be liberated in the form of small ice crystals, which may be separated by a suitable trap, as 41. Air which has been liquefied and returned to its natural or nominal aeriform condition is absolutely free from moisture. Hence in the use of the return-currents of air through the cylinder 16 there will be no danger of freezing or clogging up the exhaust-ports. Air that is expanded through valve 13, as before explained, is subjected to a second expansion through valve 45, and the said expanded air is discharged into chamber 24 around undercooling-coil 25 and carried through channel 26 to chamber 27. At first expansion some air liquefies and drops to the bottom of chamber 42 and passes from thence into the undercooling-coil 25. Although there is an exhaust here, there is still sufficient pressure to force the liquefied air into and through the undercoolering-coil, which is the coldest point in the system, and from whence it may be drawn off through the valve 48.

In the modified form of apparatus shown in Figs. 4 and 5 all the initial currents are taken directly from the cooling-coil 5 into the precooler and from thence to the counter-current condenser. The precooler is arranged with three coils instead of two, and the return-currents from the outgoing spiral coil of counter-current condenser are sent through the second coil thereof and from thence back to compression-cylinder 3 or to the power-cylinder 16 of the compresser 16, 17, and 18. The third or outer coil of the precooler is arranged, as before, to receive the exhaust-currents from the power-cylinder 16 and return them to the compression-cylinder 18.

I have described the foregoing entirely with reference to the liquefaction of air; but I wish it to be understood that I do not intend to be limited to such use, as my apparatus is equally applicable to the refrigeration and liquefaction of other gases and aeriform fluids besides air.

What I claim is—

1. In an apparatus for the refrigeration or liquefaction of aeriform fluids the combination of a counter-current condenser having incoming and outgoing channels, a compressor and cooler connected to the incoming channels a connection from the outgoing channels to the compression-cylinder of said compressor, a second compressor, a branch from said last-mentioned connection to the power-cylinder of said last-mentioned compressor a precooler having a plurality of coils, a connection between the exhaust side of said compressor power-cylinder and one end of one of the coils of said precooler, a connection between the opposite end of the said precooler-coil and the compression-cylinder of said second-mentioned compressor, and a connection between the discharge side of said second-mentioned compressor compression-cylinder and the intake side of the compression-cylinder of the first-mentioned compressor.

2. In an apparatus for the refrigeration or liquefaction of aeriform fluids the combination of a counter-current condenser having incoming and outgoing channels, a compressor and cooler connected to the incoming channels, a connection from the outgoing channels to the compression-cylinder of said compressor, a second compressor, a branch from said last-mentioned connection to the power-cylinder of said last-mentioned compressor, a precooler having a plurality of coils, a connection between the exhaust side of said compressor power-cylinder and one end of one of the coils of said precooler, a connection between the opposite end of the said precooler-coil and the compression-cylinder of said second-mentioned compressor, a connection between the discharge side of said second-mentioned compressor compression-cylinder and the intake side of the compression-cylinder of the first-mentioned compressor, and a branch connection through another of the coils of said precooler whereby certain of the currents are compelled to pass therethrough before entering the incoming channels of the counter-current condenser.

3. In an apparatus for the refrigeration or liquefaction of aeriform fluids the combination of a counter-current condenser having incoming and outgoing channels a compressor and cooler connected to the incoming channels a connection from the outgoing channels to the compression-cylinder of said compressor; a second compressor, a branch from said last-mentioned connection to the power-cylinder of said last-mentioned compressor, a precooler having a plurality of coils a connection between the exhaust side of said compressor power-cylinder and one end of one of the coils of said precooler, a connection between the opposite end of the said precooler-coil and the compression-cylinder of said second-mentioned compressor, a connection between the discharge side of said second-mentioned compressor compression-cylinder and the intake side of the compression-cylinder of the first-mentioned compressor, and a branch connection through another of the coils of said precooler whereby certain of the currents are compelled to pass therethrough before entering the incoming channels of the counter-current condenser, the point at which said last-mentioned currents are arranged to enter said incoming channels in the counter-current condenser being intermediate of the length of said channels.

4. In an apparatus for the refrigeration or liquefaction of aeriform fluids the combination of a counter-current condenser having incoming and outgoing channels, a compressor and cooler connected to the incoming channels, a connection from the outgoing channels to the compression-cylinder of said compressor, a second compressor, a branch from said last-mentioned connection to the power-cylinder of said last-mentioned compressor, a precooler having a plurality of coils a connection between the exhaust side of said compressor power-cylinder and one end of one of the coils of said precooler, a connection between the opposite end of the said precooler-coil and the compression-cylinder of said second-mentioned compressor, a connection between the discharge side of said second-mentioned compressor compression-cylinder and the intake side of the compression-cylinder of the first-mentioned compressor, and a branch connection through another of the coils of said precooler whereby certain of the currents are compelled to pass therethrough before entering the incoming channels of the counter-current condenser; a second return-channel in said counter-current condenser and a connection between the discharge end of said second return-channel and the compression-cylinder of said second-mentioned compressor.

5. In an apparatus for the refrigeration or liquefaction of aeriform fluids the combination with a counter-current condenser having incoming and outgoing channels, a compound compressor 1, 2, 3, coolers 4 and 5, connections between the channels of the counter-current condenser and the compressor as 10 and 15, a precooler having counter-current channels a second compound compressor 16, 17 and 18 connections 19, 20 and 23 as shown, coolers 29 and 30 for said second compound compressor and a connection between the two compressors through the cooler 30, all substantially as shown and described.

6. In an apparatus for the refrigeration or liquefaction of aeriform fluids the combination with a counter-current condenser having incoming and outgoing channels, a compound compressor 1, 2, 3, coolers 4 and 5, connections between the channels of the counter-current condenser and the compressor as 10 and 15, a precooler having counter-current channels, a second compound compressor 16, 17 and 18 connections 19, 20 and 23 as shown, coolers 29 and 30 for said second compound compressor, and a connection between the two compressors through the cooler 30; a second return-channel in said counter-current condenser a connection 28 between same and said second compressor, an atmospheric-air inlet as 33, and an atmospheric-air inlet as 31 for use in starting the apparatus substantially as specified.

Signed by me at New York, N. Y., this 9th day of August, 1899.

OSCAR PATRIC OSTERGREN.

Witnesses:
JAMES C. CHAPIN,
C. F. CARRINGTON.